United States Patent [19]

Matsuda et al.

[11] 4,300,118

[45] Nov. 10, 1981

[54] TIRE INNER PRESSURE DROP ALARMING SERVICE

[75] Inventors: Akira Matsuda, Higashimurayama; Norio Goshima, Musashino; Shigeo Yasuda, Musashino; Motoaki Iwasaki, Musashino; Hiroshi Nishino, Musashino, all of Japan

[73] Assignees: Bridgestone Tire Company Limited; Mitaka Instrument Company Limited, both of Tokyo, Japan

[21] Appl. No.: 12,481

[22] Filed: Feb. 15, 1979

[30] Foreign Application Priority Data

Feb. 28, 1978 [JP] Japan ............................ 53-24885[U]
Jun. 19, 1978 [JP] Japan ................................ 53-73921

[51] Int. Cl.$^3$ ............................................. B60C 23/02
[52] U.S. Cl. ..................................... 340/58; 73/146.5; 200/61.25
[58] Field of Search ...................... 340/58; 200/61.25; 73/146.5

[56] References Cited

U.S. PATENT DOCUMENTS

| 2,894,246 | 7/1959 | DeGraffenried | 340/58 X |
|---|---|---|---|
| 3,092,806 | 6/1963 | Field | 340/58 |
| 3,602,884 | 8/1971 | Brumbelow | 340/58 |
| 3,895,347 | 7/1975 | Takusagawa et al. | 340/58 |
| 4,072,927 | 2/1978 | O'Neil | 340/58 |
| 4,180,795 | 12/1979 | Matsuda et al. | 340/58 |

Primary Examiner—John W. Caldwell, Sr.
Assistant Examiner—Joseph E. Nowicki
Attorney, Agent, or Firm—Cushman, Darby & Cushman

[57] ABSTRACT

A tire inner pressure drop alarming device comprises an oscillation section mounted on a vehicle body in the vicinity of a vehicle wheel, a resonance section mounted on a peripheral portion of a tire and including a resonance coil, a signal processing and alarming section mounted on the vehicle body in spaced relation with the vehicle wheel, and a coaxial cable connecting the oscillation section and the signal processing and alarming section. The resonance coil has a major length measured in the direction of rotation and longer than a minor length of the resonance coil in a direction perpendicular to the direction of rotation. The ratio of the minor length to the major length ranges from 0.2 to 1.0.

4 Claims, 17 Drawing Figures

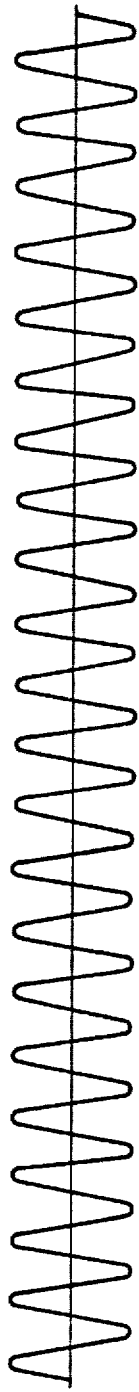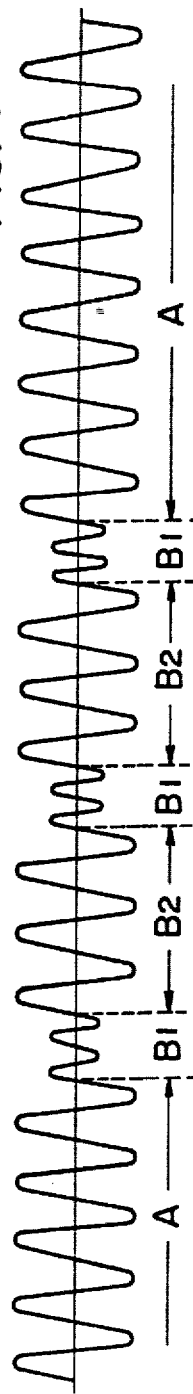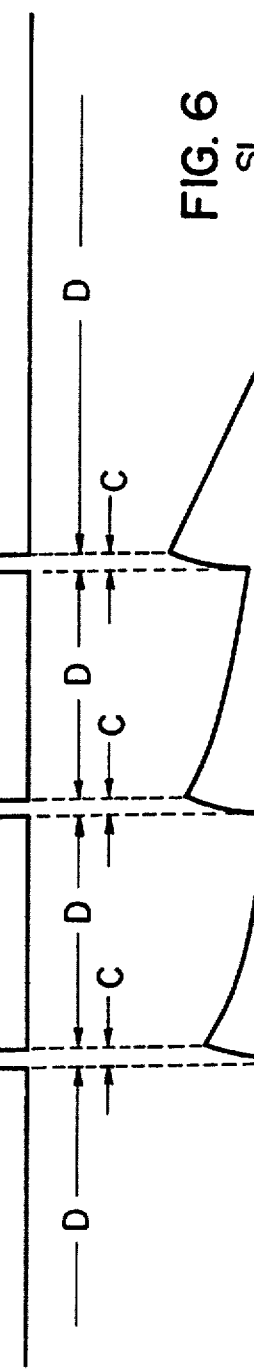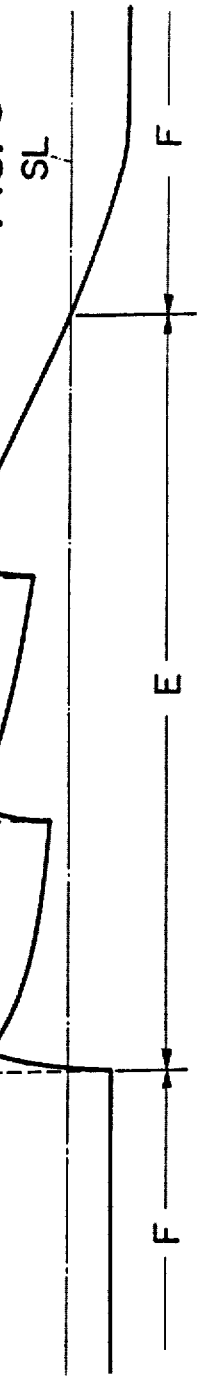

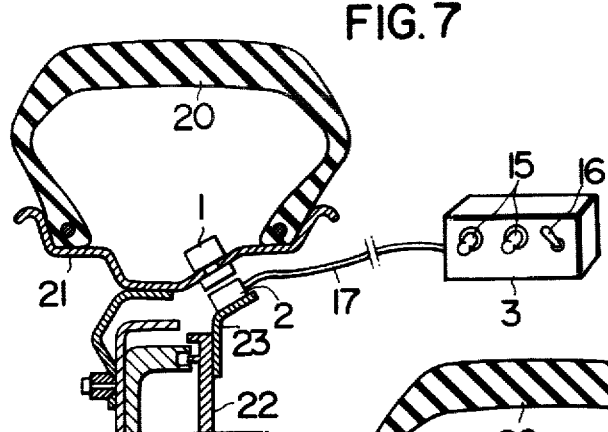
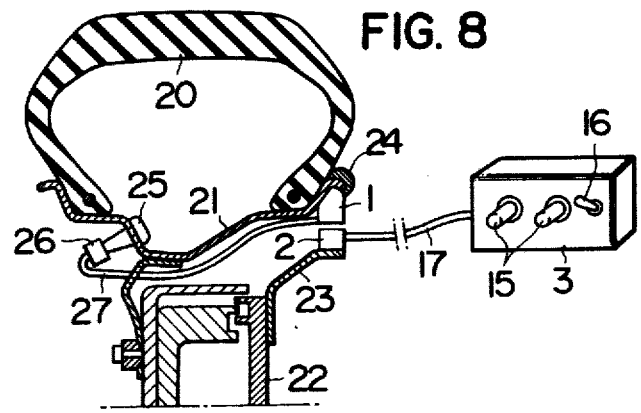
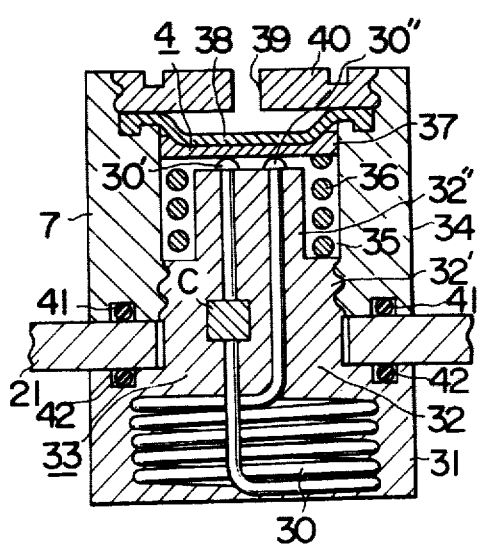
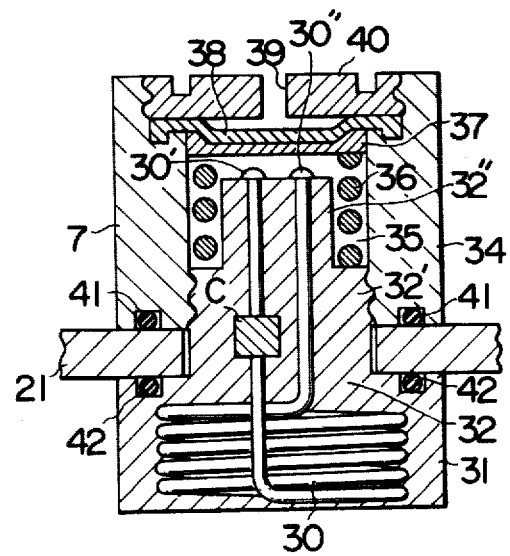

TIRE INNER PRESSURE DROP ALARMING SERVICE

FIELD OF THE INVENTION

This invention relates to a tire inner pressure drop alarming device which transforms an abnormal pressure drop of a tire into an electric signal to impart an alarm signal to a driver.

BACKGROUND OF THE INVENTION

Conventionally, an alarm device has been proposed having an oscillation section which comprises an oscillator having an oscillation coil, a detector for detecting the frequency or amplitude, a comparison circuit for emitting output pulses by comparing the output of the detector with a standard signal, and an integration circuit for integrating the output pulses of the comparison circuit. All of this apparatus was positioned on a vehicle body in the vicinity of a wheel. However, the oscillation section of the conventional alarming device was relatively complicated and bulky and settled at a position in the neighbourhood of the rotating vehicle wheel so that the oscillation section was readily damaged. Moreover, the oscillation section was apt to receive such effects as radiant heat radiated from the vehicle wheel, conductive heat conducted through a bracket supporting the oscillation section, and heat stagnated in a tire, with the result that the temperature of electric parts or elements used in the oscillation section was heightened to exceed an allowable limit of 70–80° C. It was therefore impossible to signal a driver with a high degree of reliability. In order to position the oscillation coil at all times in opposing relation with a resonance coil attached to the vehicle wheel in such a tire inner pressure drop alarming device, the oscillation coil was required to be settled below the springs of the vehicle which receives an extremely large vibrations so that the durability and reliability of the oscillation section decreased with time, resulting in obstacles for enhancing the reliability of the tire inner pressure drop alarming device. Furthermore, it was a common practice to position the resonance coil outside of and immediately below a rim flange so as to avoid damages caused by collision with many obstacles on the road. If the resonance coil has an entirely circular cross-section under the state that the resonance coil is assembled outside of and immediately below the rim flange, a maximum entire circle diameter is necessarily restricted and a radial electric magnetic wave from the oscillation coil opposing the resonance coil was not effectively received by the resonance coil, which makes it impossible to emit an alarm with a high degree of reliability.

SUMMARY OF THE INVENTION

It is therefore an object of the present invention to provide a tire inner pressure drop alarming device which overcomes all of the drawbacks brought about by the conventional tire inner pressure drop alarming device to remarkably enhance its durability and reliability.

It is another object of the present invention to provide a tire inner pressure drop alarming device which can be produced inexpensively.

It is still another object of the present invention to provide a tire inner pressure alarming device which can permit a space between the resonance coil and the oscillation coil to be as wide as possible in consideration of an error under an assembled state of the resonance coil and the oscillation coil, collision of the resonance coil and the oscillation coil with obstacles on the roads, and continuously repeated oscillation of the resonance coil and the oscillation coil during running of a vehicle, and in which the magnetic energy is effectively exchanged between the resonance coil and the oscillation coil to accomplish its maximum regular performance.

BRIEF DESCRIPTION OF THE DRAWINGS

The above and other objects, features and advantages of the present invention will become clear from the following particular description of the invention and the appended claims, taken in conjunction with the accompanying drawings which show by way of example a preferred embodiment of the present invention.

In the accompanying drawings:

FIG. 3 is a wave form showing an oscillated state of an oscillation circuit of the tire inner pressure drop alarming device;

FIG. 4 is a wave form showing an oscillated state of the oscillation circuit which receives an effect of a resonator;

FIG. 5 is a wave form showing an output of a comparison circuit of the tire inner pressure drop alarming device;

FIG. 6 is a wave form showing an output of an integration circuit of the tire inner pressure drop alarming device;

FIG. 7 is a cross-sectional view of the tire inner pressure drop alarming device wherein the resonator is mounted on an inclined face of a rim of a vehicle wheel;

FIG. 8 is a cross-sectional view similar to FIG. 7 but showing the resonator which is mounted on a rim flange portion of the vehicle wheel;

FIG. 9 is an enlarged cross-sectional view of the resonator which is under a normal internal pressure of a tire and which comprises a pressure detecting switch, a resonating capacitor, and a resonance coil all of which are integrally assembled;

FIG. 10 is an enlarged cross-sectional view of the resonator similar to FIG. 9 but showing the state of the resonator which is under an abnormal internal pressure of the tire;

DESCRIPTION OF THE PREFERRED EMBODIMENTS

Figure 1:
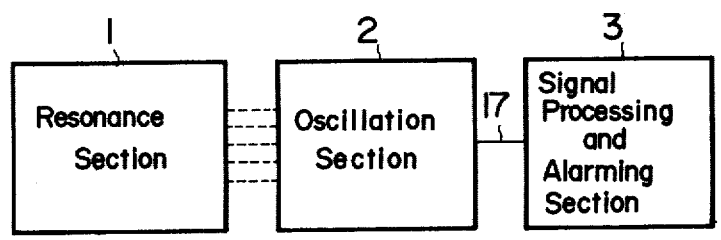
FIG. 1 is a block diagram showing a principle of a tire inner pressure drop alarming device in accordance with the present invention.
Figure 2:
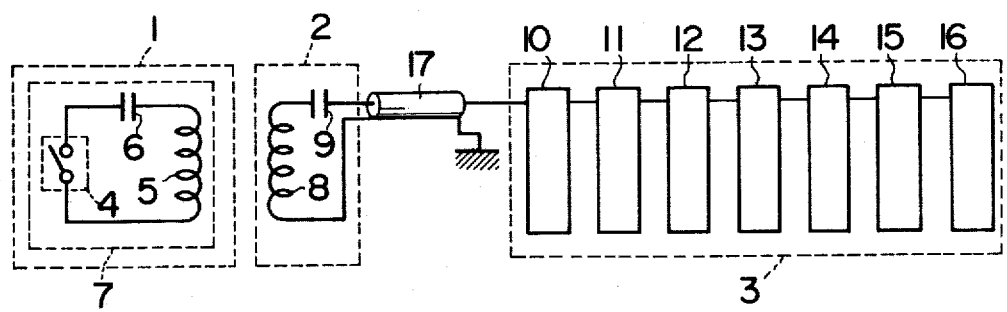
FIG. 2 is another block diagram showing a construction of the tire inner pressure drop alarming device.

FIG. 1, illustrates a tire inner pressure drop alarming device which generally comprises a resonance section 1, an oscillation section 2, and a signal processing and alarming section 3. As best shown in FIG. 2, the resonance section 1 is a resonator 7 which comprises a tire inner pressure detecting switch 4, a resonance coil 5 and a resonating capacitor 6 which are connected in series relation with each other. The foregoing resonator 7 is adapted to be mounted on and rotated together with each wheel of a vehicle as will be described below. The oscillation section 2 comprises an oscillation coil 8 and an oscillating capacitor 9 which are connected in series relation with each other. The foregoing oscillation section 2 has a function of radiating magnetic energy together with the oscillation circuit 10 of the signal processing and alarming section 3 and is adapted to be mounted on a stationary vehicle body part in close and opposing relation with the resonance section 1. In this case, the space internal between the oscillation section 2 and the resonance section 1 may be 5–40 mm, preferably 7–30 mm. The signal processing and alarming section 3 comprises an oscillation circuit 10, a detection circuit 11 for detecting an output of the oscillation circuit 10, a comparison circuit 12 for comparing an output of the detection circuit 11, an integration circuit 13 for integrating an output of the comparison circuit 12, a logical circuit 14 for logically calculating an output of the integration circuit 13, a displaying device 15, and a power source switch 16, all of which are integrally formed or assembled and mounted on the vehicle body at a suitable position remote from the vehicle wheels of the vehicle, such as for example at a position adjacent to a driver seat. The oscillation frequency of the oscillation circuit 10 which oscillates only by working together with the oscillation section 2 ranges from 20–30 KHz to 20–30 MHz, preferably 100 KHz to 5 MHz. The oscillation section 2 and the oscillation circuit 10 of the signal processing and alarming section 3 are connected by means of a coaxial cable 17.

With reference to FIGS. 3 to 6, the operation of the tire inner pressure drop alarming apparatus embodying present invention will prarticularly be described hereinafter.

The tire inner pressure detecting switch 4 of the resonance section 1 shown in FIG. 2 is adapted to be closed during a normal internal pressure of a tire and to be opened during an abnormal pressure of the tire thereby to enable resonating state of the resonator 7 changed so that the change of the tire inner pressure, particularly reduction of pneumatic pressure is detected by the detecting switch 4. The particular description of the detecting switch 4 will appear hereinafter. Resonator 7 resonates when pressure detecting switch 4 is closed upon the normal internal pressure and stops resonating when the pressure detecting switch 4 is open upon the abnormal internal pressure. FIG. 3 illustrates the output of the oscillation circuit 10 of the signal processing and alarming section 3 when it is oscillating. FIG. 4 illustrates the fluctuation in output in the oscillation circuit 10 as the resonator 7 is moved to the vicinity of the oscillator 2. Portion A of the wave form is generated either when switch 4 is open (due to a reduction of the internal pressure during running of the vehicle) or the resonator 7 is stationarily positioned away from the oscillator 2 thereby to cause the oscillator 2 to receive no effect from the resonator 7. Thus, under these conditions the resonator 7 does not impart any effect to the oscillation circuit 10. Portion B of the wave form is generated by the oscillation circuit 10 (as affected by the resonator 7) when the tire pressure is normal while the vehicle is running. The portion $B_1$ of FIG. 4 is generated while the resonator 7 is positioned adjacent the oscillator 2. Within the interval $B_1$, the magnetic energy of the oscillator 2 is absorbed by the resonator 7 so that electric current of the oscillator 2 is decreased. Portion $B_2$ is generated when the resonator 7 is remote from the oscillator 2. In the interval $B_2$, the oscillation circuit 10 does not receive any effect from the resonator 7 the amplitude of the oscillation current of the oscillation circuit 10 is restored.

It is to be noted that the wave forms in the intervals $B_1$ and $B_2$ are amplitude modulated signals.

The output of the oscillation circuit 10 as illustrated in FIG. 4 is detected by the detecting circuit 11, and voltage values of predetermined amplitude as shown in the intervals A and $B_2$ of FIG. 4 are compared with the fluctuated or changed voltage values as shown in the intervals $B_1$ of FIG. 4 by the comparison circuit 12 which has an output as shown in FIG. 5. The comparison circuit 12 is designed to generate a number of output pulses in a predetermined time represented in the interval C when the change amount of the amplitude in the intervals $B_1$ and $B_2$ increases above a predetermined level and not to generate any pulse when the change amount of the amplitude in the intervals A and $B_2$ decreases below the predetermined level. Also, the comparison circuit 12 is so constituted as to generate such pulses in a predetermined time only when the interval A is changed into the interval $B_1$ and the interval $B_2$ is changed into the interval $B_1$ and to generate no pulse when the interval $B_1$ is changed into the interval $B_2$ and the interval $B_1$ is changed into A. The wave form shown in FIG. 5, i.e., the output of the comparison circuit 12 is integrated by the integration circuit 13 which generates a wave form as shown in FIG. 6. The integration circuit 13 is adapted to start integration from the first edge of the pulse in the interval C and to finish the integration at the second edge of the pulse in the interval C. As a consequence, the pulses are continuously generated as shown in FIG. 5 during running of the vehicle under a normal tire pressure so that the output of the intregation circuit 13 become an integrated wave form and finally saturated as shown in the interval E of FIG. 6 while becoming a damped wave form below a predetermined level SL as shown in the intervals F of FIG. 6 under abnormal conditions, i.e., upon decrease of the internal tire pressure or upon stoppage of the vehicle. It is therefore to be appreciated that when the internal tire pressure drops below the predetermined level during running of the vehicle to cause the pressure detecting switch 4 of the resonator 7 to be switched off, resulting in the resonator being inoperative, the oscillation circuit 10 generates continuous oscillation signals as shown in the interval A of FIG. 4 so that the output of the comparison circuit 12 becomes zero amplitudes as shown in the interval D of FIG. 5. Therefore, no pulse is generated by the comparison circuit 12 thereby to cause the wave forms of the integration circuit 13 to become zero or damped below the predetermined level SL as shown in the interval F of FIG. 6. In the event that the amplitude decreases below the predetermined level SL signals are emitted from the integration circuit which are detected by means of the logical circuit 14 to cause the displaying device 15 to alarm a driver. For example, if a displaying lamp is employed as the displaying device, the lighting of the displaying lamp enables the driver to know the fact that the internal tire pressure has decreased below the predetermined level. For such displaying means in this case, it may be possible to illuminate the displaying lamp with a green color under normal internal tire pressure conditions, while illuminating the displaying lamp with a red color under abnormal internal tire pressure conditions. It is possible to omit the green lamp to reduce cost and to illuminate a red colored lamp either under normal internal tire pressure conditions when the vehicle is stopped, or under an abnormal internal tire pressure conditions and an abnormally operated state of the alarming device during running of the vehicle. It is preferable that the relation between the predetermined level SL and an electric discharge time constant of the integration circuit 13 be determined so that the electric discharge curve of the integration circuit shown in FIG. 6 does not decrease below the predetermined level SL during low vehicle speeds, such as for example 10 Km/hour.

The tire inner pressure drop alarming device of the present invention will now be described with reference to FIG. 7, the resonance section 1 of the alarming device of the present invention is securely mounted on a peripheral portion of a vehicle wheel, such as for example an inclined face of a recessed portion of a rim 21 which supports a tire 20. The oscillation section 2 is securely mounted on a bracket 23, secured to a vehicle body 22, in opposing relation with the resonance section 1. The oscillation section 2 is connected through the coaxial cable 17 with the signal processing and alarming section 3 which is mounted on a dashboard in front of a driver seat.

FIG. 8 illustrates an embodiment in which the resonance section 1 of the alarming device of the present invention is attached to a rim flange portion 24 of the vehicle wheel. The reference numerals of FIG. 8 same as those of FIG. 7 represent same elements or parts as those of FIG. 7. In the embodiment of FIG. 8, the pressure detecting switch 4 of the resonance section 1 is designed to be connected with a valve 25 through an air pipe 27 and a nut 26 screwed to the valve 25.

There will be described with reference to FIGS. 9 and 10 how the pressure detecting switch 4 of the resonance section 1 as shown in FIG. 7 is closed and opened in response to the change of the internal tire pressure thereby to cause the resonating state of the resonator 7 to be changed.

FIG. 9 shows a state that the internal pressure of the tire 20 is under a normal state to cause the detecting switch 4 to be closed. In this embodiment, the resonance section 1 comprises a block generally indicated by the reference numeral 33 and made of a resin, the block 33 having a rim flange portion 31 housing therein a resonance coil 30 and a resonating capacitor C and a cylindrical column 32 threaded on the peripheral surface thereof, a cylindrical casing 34 having on its inner peripheral surface a threaded portion in threaded engagement with the threaded portion 32' of the cylindrical column 32, a compression coil spring 36 accommodated in a spring chamber 35 defined between the cylindrical casing 34 and a small diameter column portion 32" of the column 33, a metal switch plate 37 engaged with the upper end of the compression coil spring 36 and contactable with a pair of coil terminals 30' and 30" of the resonance coil 30, a diaphragm 38 urging the metal switch plate 37 onto the coil terminals 30' and 30" against the compression coil spring 36 under the normal internal tire pressure, and a cover plate 40 having an air passage 39 at its center and screwed to the upper portion of the cylindrical casing 34. Namely, the pressure detecting switch 4 of the resonance section 1 is generally constituted by the diaphragm 38, the metal switch plate 37 and the compression coil spring 36. The above mentioned resonance section 1 is attached to the vehicle wheel in such a way that the rim flange portion 31 and the cylindrical casing 34 are securely mounted on the rim 21 of the vehicle wheel through 0-rings 41 and 42. More specifically, the cylindrical column 32 is inserted into an aperture formed in an inclined portion of the rim 21 and the cylindrical casing 34 is screwed with the threaded portion 32' of the cylindrical column 32 so that the cylindrical casing 34 and the rim flange portion 31 may be hermetically sealed with the rim 21 of the vehicle wheel by means of the 0-rings 41 and 42. The compression coil spring 36 is then accommodated in the spring chamber 35 defined by the small diameter column portion 32" and the cylindrical casing 34, and the metal switch plate 37 and the diaphragm 38 are mounted on the upper end of the compression coil spring 36. The cover plate 40 is then screwed with the upper end portion of the cylindrical casing 34 to fix and attach the periphery of the diaphragm 38 to the upper end portion of the cylindrical casing 34.

When the internal tire pressure remains under a normal state, the compressed air in the tire 30 passes through the air passage 39 of the cover plate 40 and urges the diaphragm 38 against the compression coil spring 36 toward the small diameter column portion 32" so that the coil terminals 30' and 30" are electrically contacted with the metal switch plate 37.

When the internal tire pressure decreases below a predetermined level, the diaphragm 38 and the metal switch plate 37 are urged toward the cover plate 40 by the force of the compression coil spring 36 as shown in FIG. 10 the coil terminals 30' and 30" come to be spaced from the metal switch plate 37 so that the resonator 7 is opened.

Figure 11:
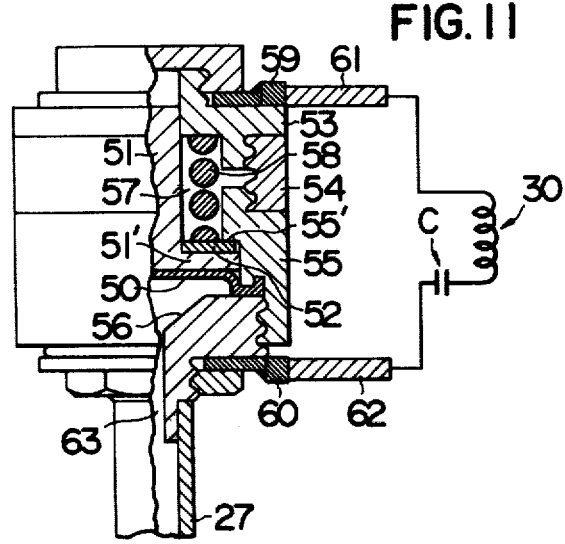
FIG. 11 is an enlarged view partially cross-sectioned of the resonator which is under a normal internal pressure of the tire
Figure 12:
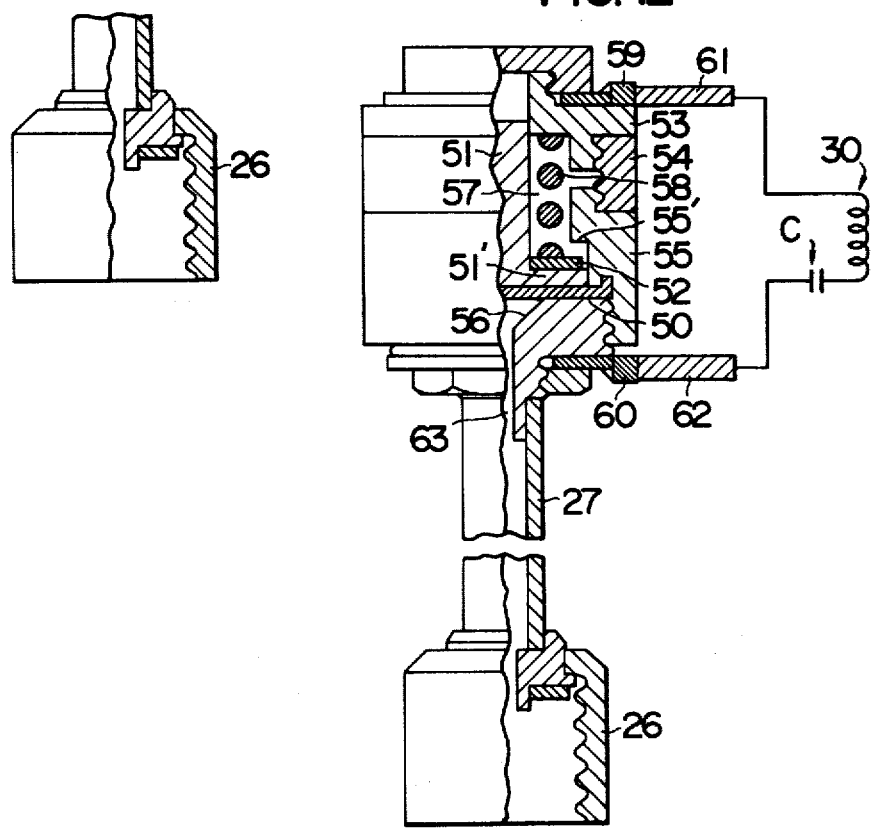
FIG. 12 is an enlarged view partially cross-sectioned of the resonator similar to FIG. 11 but showing the state under an abnormal internal pressure of the tire.

FIGS. 11 and 12 show a construction of another embodiment of the pressure detecting switch 4 of the resonance section 1 which is attached to the rim flange portion 24. FIG. 11 shows the construction of the pressure detecting switch 4 under the normal internal pressure of the tire 20. In this embodiment, the pressure detecting switch comprises a diaphragm 50, a piston 51 and a contact ring 52. The piston 51 is movably housed in a cylinder which is constituted by a metal cover plate 53, an insulating ring 54, a metal case 55, and a diaphragm biasing member 56. The insulating ring 56 is in threaded engagement with the metal cover plate 53 and the metal case 55, the latter of which is in turn in threaded engagement with the diaphragm biasing member 56. A spring chamber 57 is defined by the piston 51, the cover plate 53, the insulating ring 54 and the metal case 55 to accommodate therein a compression coil spring 58 made of a metal. The cover plate 53 and the diaphragm biasing member 56 are respectively electrically connected with terminals 59 and 60 which are in turn electrically connected with lead lines 61 and 62, respectively. The lead lines 61 and 62 are respectively electrically connected with the resonance coil 30 and capacitor C of the resonator 7. In the central portion of the cover plate 56 is formed an air passage 63 which is connected through the air pipe 27 and the nut 26 with the valve 25 as will be seen in FIG. 8.

When the internal pressure of the tire 20 remains under a normal condition, the pressure acts on the diaphragm 50 through the valve 25, nut 26, the air pipe 27 and the air passage 63 so that the piston 51 is urged against the metal compression coil spring 58 and thus the contact ring 52 mounted on a flange portion 51' of the piston 51 is pressedly contacted with a projecting portion 55' of the metal case 55. As a consequence, the resonator 7 is closed through the lead lines 61, 62, the terminals 59, 60, the metal cover plate 53, the metal compression coil spring 58, the contact ring 52, the metal case 55, and the diaphragm biasing member 56.

When the internal tire presure decreases below a predetermined level, the diaphragm 50 and the piston 51 are urged to the diaphragm biasing member 56 by the force of the metal compression coil spring 58 so that the projecting portion 55' of the metal case 55 comes to be spaced from the metal contact ring 52, thereby opening the resonator 7.

Figure 13:
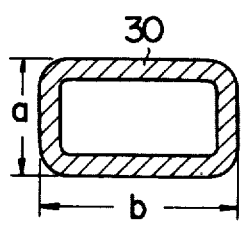
FIG. 13 is a cross-sectional view showing one embodiment of the resonance coil of the alarming device of the present invention.
Figure 14:
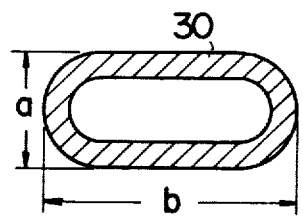
FIG. 14 is a cross-sectional view showing another embodiment of the resonance coil of the alarming device of the present invention.
Figure 15:
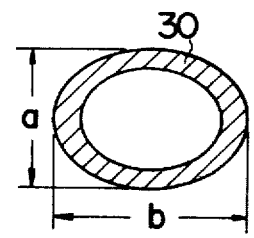
FIG. 15 is a cross-sectional view showing still another embodiment of the resonance coil of the alarming device of the present invention.

In FIG. 13, there is shown a cross-section of each of the resonance coils 5 and 30 which is cross-sectioned at a plane perpendicular to magnetic lines of force in each of the resonance coils 5, 30 and the oscillation coil 8 generated when each of said resonance coils 5, 30 is brought into face-to-face relation with the oscillation coil 8 and parallel with a plane separating each of said resonance coils 5, 30 and said oscillation coil 8. The cross-section of each of the resonance coils 5 and 30 is formed to have a flat cross-section which has a major length, measured in the rotational direction of each of the resonance coils 5 and 30 rotated together with the vehicle wheel, longer than a minor length measured in the direction perpendicular to the rotational direction of each of the resonance coils 5 and 30 According to the present invention, the cross-section of each of the resonance coils 5 and 30 may be formed into a flat circular or oblong shape or an ellipse shape as shown in FIGS. 14 and 15. It is required that the resonance coils 5 and 30 each has such a cross-section that a value c obtained by dividing a minor length a by a major length b is no less than 0.2 and less than 1.0. If the value c is less than 0.2, it is extremely difficult to form the radially inner side of each of the resonance coils 5 and 30 into an arcuate shape which is required for being in preferred registry with the rim flange portion 24. If the value c is more than 1.0, any advantage will not be expected as the description proceeds. The resonance coils 5 and 30 which are constructed as above enable the allowable attachment limits to be extended so that even if the oscillation coil 8 is provided at a somewhat erroneous position performance of the alarming device of the present invention is by no means decreased. Even if the oscillation coil 8 is somewhat displaced from its original position due to deflection of the tire 20 and vibration of the vehicle body, the performance of the alarming device is also not lowered.

The experimental examples for confirming the advantages of the resonance coils 5 and 30 thus constructed above will now be described hereinafter.

Figure 16:
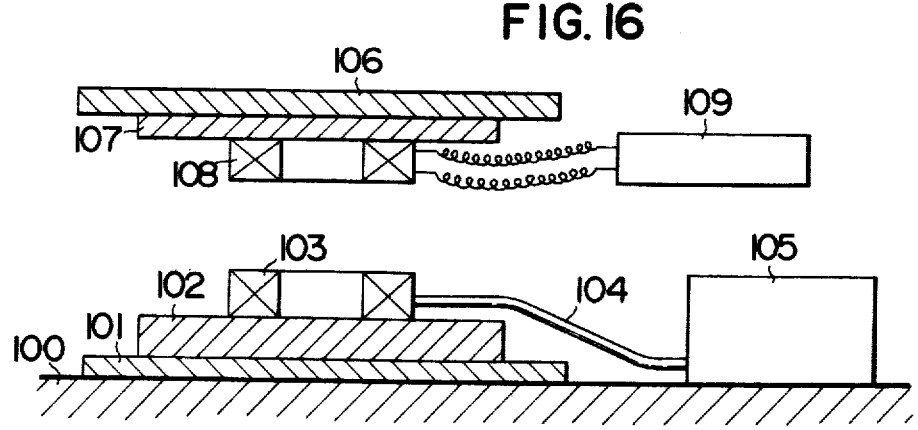
FIG. 16 is a cross-sectional view of a testing device for testing function and advantages of the resonance coil of the alarming device of the present invention.

The testing device as shown in FIG. 16 was employed to comprise a flat iron plate 101, corresponding to the bracket 23, mounted on a floor 100, an acryl resin plate 102 with 10 mm thickness mounted on the iron plate 101, an oscillation coil 103 mounted on the acryl resin plate 102, an oscillator 105 electrically connected with the oscillation coil 103 through a coaxial cable 104, an iron plate 106, corresponding to the rim flange portion 24, positioned above the oscillation coil 103 and movable toward and away from the oscillation coil 103, an acryl resin plate 107 with 4 mm thickness attached to the lower surface of the iron plate 106, a resonance coil 108 attached to the lower surface of the acryl resin plate 107 in coaxial relation with the oscillation coil 103, and a capacitor 109 electrically connected with the both terminals of the resonance coil 108. The oscillation coil 103 was formed in a entirely circular shape in cross-section to have a diameter of 33 mm, an inductance 200 $\mu$H, and a sensitivity Q of 120. The oscillation frequency of the oscillation coil 103 was variable in the range of 500–580 KHz and its voltage output was kept constant. On the other hand, the resonance coils 108 were formed to have a constant minor length a of 18 mm and major lengths b of 18 mm, 24 mm, 26 mm, 30 mm, 36 mm, 43 mm, 57 mm, 70 mm, and 90 mm. The rectangularly, oblongly and elliptically cross-sectioned resonance coils 108 were prepared for each size of those different in the minor length a and the major length b. In the event that a resonance circuit is constituted by the capacitor 109 and the resonance coil 108, its resonance frequency of approximately 540 KHz was selected.

The procedure of the test carried out by employing the foregoing testing device will now be described hereinafter.

Figure 17:
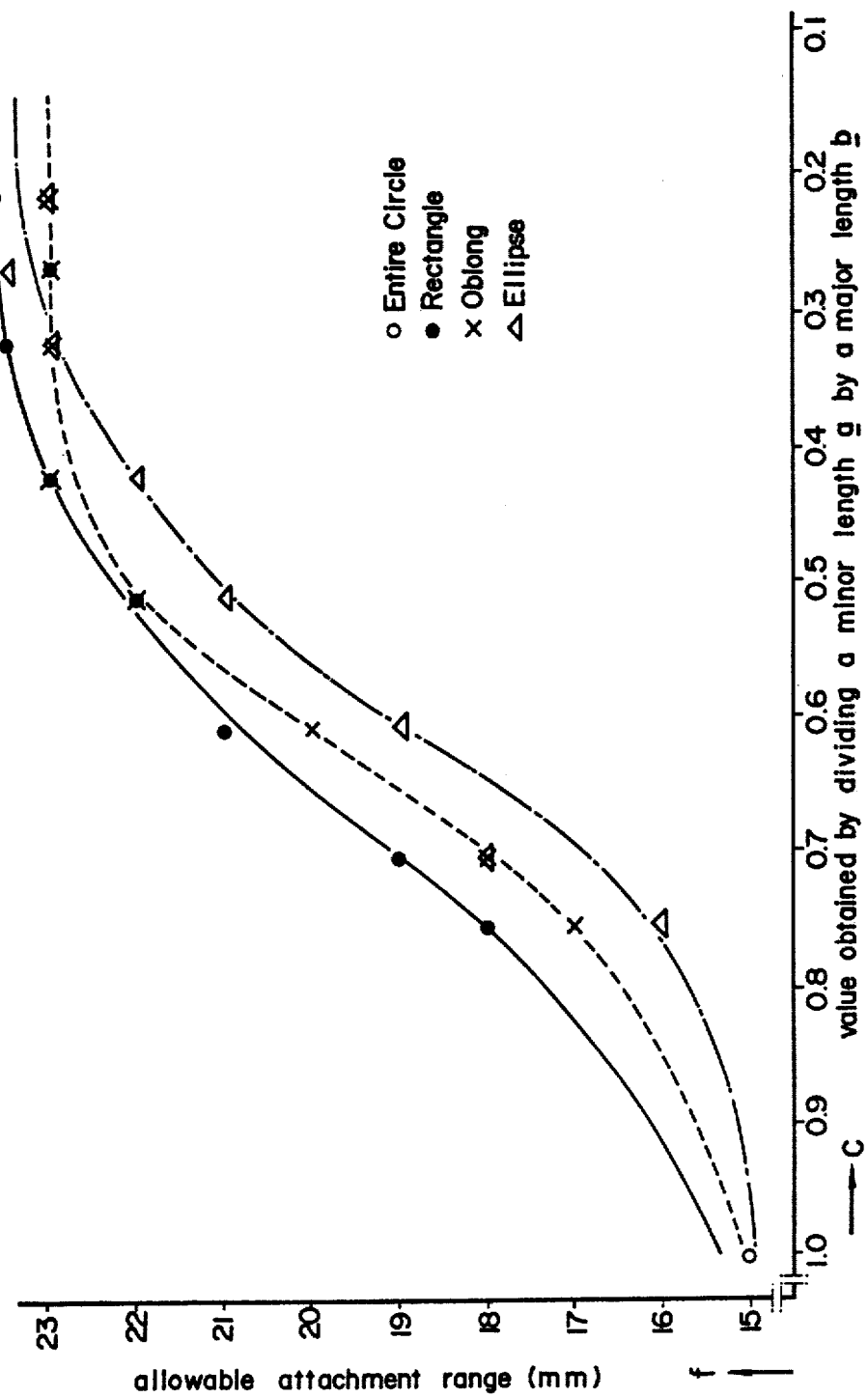
FIG. 17 is a graph of tested results showing an allowable attachment range at the axis of ordinate, and a value obtained by dividing a minor length of the resonance coil by a major length thereof at the axis of abscissa.

Firstly, a suitable resonance coil 108 was attached and then the oscillation frequency of the oscillator 105 was varied to be tuned with the resonance frequency of the resonance circuit. The resonance coil 108 was then moved together with the iron plate 106 toward the oscillation coil 103 and stopped when the oscillation output of the oscillator 105 was decreased due to energy absorption by the resonance coil 108 to emit an alarm. At this time, the distance between the oscillation coil 103 and the resonance coil 108 was measured to obtain a measured value which was called a movable maximum distance d. The resonance coil 108 and the acryl resin plate 107 were removed from the iron plate 106, and thereafter the iron plate 106 which is larger in area than the oscillation coil 103 was moved toward the oscillation coil 103 until the alarm was generated. At this time, the distance between the oscillation coil 103 and the iron plate 106 was measured to obtain a movable minimum distance e. The value obtained by deducting the movable minimum distance e from the movable maximum distance d becomes an allowable attachment range f with the oscillation coil 103 fixedly positioned, whereas the value obtained by deducting the movable minimum distance e from the movable maximum distance d becomes an allowable attachment range f of the resonance coil 108 with the resonance coil 108 fixedly positioned. Subsequently, a number of similar tests were repeatedly performed with new resonance coil 108 exchanged by an old one to obtain the previously mentioned movable maximum distances d, movable minimum distances e and allowable attachment ranges f. The results of the tests were described in a table hereinlater appeared and shown in a graph of FIG. 17. In the table, the legend c represent a value obtained by dividing the minor length a of the resonance coil 108 by the major length b of the resonance coil 108.

oscillation coil, said cross-section having a major length, measured in the rotational direction of said

| | Coil Shape a × b (mm) | 18 × 18 | 18 × 24 | 18 × 26 | 18 × 30 | 18 × 36 | 18 × 43 | 18 × 57 | 18 × 70 | 18 × 90 |
|---|---|---|---|---|---|---|---|---|---|---|
| | c | 1.0 | 0.75 | 0.70 | 0.60 | 0.50 | 0.41 | 0.31 | 0.26 | 0.20 |
| Movable | Rectangle | — | 30.0 | 31.0 | 33.0 | 34.0 | 35.0 | 35.5 | 35.0 | 35.5 |
| Maximum | Oblong | — | 29.0 | 30.0 | 32.0 | 34.0 | 35.0 | 35.0 | 35.0 | 35.0 |
| Distance | Ellipse | — | 28.0 | 30.0 | 31.0 | 33.0 | 34.0 | 35.0 | 35.5 | 35.0 |
| d (mm) | Entire Circle | 27 | — | — | — | — | — | — | — | — |
| Movable Minimum Distance e (mm) | | 12 | 12 | 12 | 12 | 12 | 12 | 12 | 12 | 12 |
| Allowable | Rectangle | — | 18.0 | 19.0 | 21.0 | 22.0 | 23.0 | 23.5 | 23.0 | 23.5 |
| Attach- | Oblong | — | 17.0 | 18.0 | 20.0 | 22.0 | 23.0 | 23.0 | 23.0 | 23.0 |
| ment | Ellipse | — | 16.0 | 18.0 | 19.0 | 21.0 | 22.0 | 23.0 | 23.5 | 23.0 |
| Range f (mm) | Entire Circle | 15 | — | — | — | — | — | — | — | — |

The alarming device according to the present invention may be applied for dual tires. In this case, it is required to respectively attach to the dual tires the pressure detecting switches which are electrically connected in series relation with only one resonance coil and only one resonating capacitor, so that when one of the tires is decreased in its internal pressure the alarming device comes to generate an alarm. The oscillation circuit, the detecting circuit, the comparison circuit and the integration circuit of the signal processing and alarming section may be integrally assembled to be mounted at a suitable position of the vehicle body which receives slight effects such as for example, temperature, vibration, damages, etc., and the logical circuit, the displaying device, and the electric power switch may also be integrally assembled to be positioned in front of the seat of the driver. Such construction results in decreasing the amount of the coaxial cable as well as decreasing parts to be positioned in front of the driver seat, which makes it possible to readily select positions of the parts or elements and to settle the displaying devices at a desirable position.

Although particular embodiments of the present invention have been shown and described, it will be obvious to those skilled in the art that various changes and modifications may be made without departing from the spirit and scope of the present invention.

What is claimed is:

1. A tire inner pressure drop alarming device for transforming an abnormal pressure drop of a tire into an electric signal to alarm a driver, which comprises:
   an oscillation section mounted on a vehicle body in the vicinity of a vehicle wheel and including an oscillation coil and an oscillating capacitor, the oscillation state of radial magnetic energy in said oscillation coil changing in response to said abnormal pressure drop;
   a resonance section mounted on a peripheral portion of said vehicle wheel in the vicinity of said oscillation coil, and including a resonance coil resonating said magnetic energy generated from said oscillation coil, a resonating capacitor and a pressure detecting switch in response to the abnormal pressure drop of said tire, said resonance coil having an elongated cross-section disposed in a plane perpendicular to magnetic lines of force between said resonance coil and oscillation coil generated when said resonance coil is brought into face-to-face relation with said oscillation coil and parallel with a plane separating said resonance coil and said oscillation coil, said cross-section having a major length, measured in the rotational direction of said resonance coil rotated together with said vehicle wheel, longer than a minor length measured in the direction perpendicular to said rotational direction of said resonance coil with a value obtained by dividing said minor length by said major length being no less than 0.2 and less than 1.0;
   a signal processing and alarming section mounted on said vehicle body in spaced relation with said vehicle wheel, and including an oscillation circuit cooperating with said oscillation section for effecting an oscillating action by radiating said magnetic energy from said oscillation section to change said oscillation state in cooperation with said oscillation section in response to said abnormal pressure drop, a detecting circuit detecting an output of said oscillation circuit, a comparison circuit for comparing the output of said detecting circuit with a standard signal to generate a plurality of output pulses, an integration circuit for integrating said output pulses of said comparison circuit, a logical circuit for logically calculating an output generated from said integration circuit, an alarming means for emitting an alarm with an output generated from said logical circuit, and a power source switch; and
   a coaxial cable connecting said oscillation section and signal processing and alarming section.

2. A tire pressure drop alarming circuit as set forth in claim 1, wherein said detecting circuit is an amplitude detecting circuit.

3. A vehicle tire pressure alarm device for transforming an abnormal tire pressure into an electric signal to alarm a driver, which comprises:
   means mounted on the body of said vehicle near a wheel of said vehicle for radiating a magnetic field;
   a unit mounted on a peripheral portion of said vehicle wheel including means for absorbing energy from said magnetic field on selected revolutions of said tire and switch means for detecting said abnormal tire pressure and controlling said absorption in response to said detecting, said absorbing means including a resonance coil having an elongated cross-section disposed in a plane perpendicular to magnetic lines of force between said resonance coil and said radiating means generated when said resonance coil is brought into face-to-face relation with said radiating means and parallel with a plane separating said resonance coil and said radiating means, said cross-section having a major length, measured in the rotational direction of said resonance coil rotated together with said vehicle wheel, longer than a minor length measured in the direction perpendicular to said rotational direction of said resonance coil with a value obtained by dividing said minor length of said major length being no less than 0.2 and less than 1.0; and a signal processing and alarm section mounted on said vehicle body remote from said radiating means, and including means in combination with said radiating means for generating an oscillating signal, means for detecting the amount of energy in said magnetic field, means for comparing the energy in said magnetic field during said selected revolutions with the energy in said magnetic field during non-selected revolutions and for generating a plurality of output pulses during one of selected and non-selected revolutions, an integration circuit for integrating said output pulses of said comparing and generating means, a logic circuit for logically producing a signal from the output of said integration circuit upon detection of said abnormal tire pressure, and means for emitting an alarm in response to said signal from said logic circuit.

4. A vehicle tire pressure alarm device as set forth in claim 3, wherein said detecting means is an electrical signal amplitude detecting circuit.

* * * * *